June 1, 1965  R. R. MAILLOT  3,186,190
COUPLING DEVICE
Filed Sept. 30, 1963

INVENTOR
ROBERT RENÉ MAILLOT
BY LeBlanc + Shur
ATTORNEYS

United States Patent Office 3,186,190
Patented June 1, 1965

3,186,190
COUPLING DEVICE
Robert René Maillot, Colombes, France, assignor to Peugeot & Cie, Audincourt, Doubs, France, a corporation of France
Filed Sept. 30, 1963, Ser. No. 312,715
Claims priority, application France, Dec. 20, 1962, 919,265, Patent 1,350,834
2 Claims. (Cl. 64—30)

The present invention relates to connections between a driving member and a driven member whether it concerns coaxial aligned shafts, or shafts or other elements connected by a kinematic device, such as a gear transmission.

Such connections are generally achieved by mechanical couplings which connect either the two shafts or other elements together or, in the case of gears, these gears to the respective driving and driven members.

The connections obtained by these mechanical methods (whether they be of the type having keys, knurlings, flutings, pins or the like) prevent any relative displacement between the interconnected members.

Consequently, the tangential force is wholly transmitted by the driving shaft or other member to the receiving driven shaft, even in the event of a sudden blocking of this driven shaft. The driving shaft, which is driven by a motor and rotates at high speed, transmits directly to the blocked driven shaft a violent shock which is due to the force of inertia or kinetic energy and is somewhat similar to a hammer blow. It is known that this violent shock presents a very serious drawback in certain elements, in particular in gears and especially those of plastics material which are positively fixed to their respective shafts generally by a knurling on which these gears are directly moulded.

In order to resist this violent shock without rupture of a shaft or of the gear teeth it is necessary to provide wide margins of safety which result in dimensions which are not always compatible with certain general dimensions of a given machine.

Moreover, it is found in all formulae for the various materials that, allowance must be made for the fact that the gears are liable to be subjected to a blocking torque which is greater than the operational torque and they must therefore be calculated by using the ultimate stress formula of the considered material. For example, in the calculation of a gear which is metallic or of plastics material it is supposed that a single tooth must support the entire load. In the case of a continuous load the bending stress is taken into account whereas in the case of a blocking load the ultimate stress must be considered.

In the case of a gear and in respect of a given material, the module of the gear is therefore calculated for a given tangential force—which amounts to calculating the sectional strength of one tooth.

As is known, in conventional solutions ruptures are avoided for example in machine tools by interconnecting some of the elements in a positive manner by safety keys or pins or other torque-limiting devices which often constitute a complicated construction and shear or give way under the effect of the blocking load instead of, for example, the shaft or a tooth of the considered gear.

The object of the present invention, which bears in mind the foregoing considerations, is to provide an improved coupling device for rotational motion between a driving member and a driven member which permits the driven member to rotationally slip relative to the driving member and moreover is capable, for a given temperature, of acting as an automatic uncoupling or coupling clutch device or braking device so that the blocking load can be absorbed by a progressive braking which is substituted for the violent shock or, in other words, is capable of clutching, declutching or braking.

In this improved coupling device, there is disposed between the driving member and driven member at least one element of plastics material which is fitted through the medium of a smooth cylindrical surface on a corresponding smooth cylindrical ground surface on one of said members, the fit between said element and said member being such that this element is capable of transmitting the normal torque but slips on the member for a greater torque.

According to another feature, the plastics material chosen is such that its coefficient of expansion is several times greater than that of the material of which the corresponding member is composed so that when slip occurs between the element of plastics material and said member accompanied by a frictional force, heat is generated and there is consequently a progressive expansion of said element which is greater than that of said member whereby a progressive uncoupling is achieved as the temperature rises.

Further features and advantages of the invention will be apparent from the ensuing description, with reference to the accompanying drawings to which the invention is in no way limited.

Figure 1:
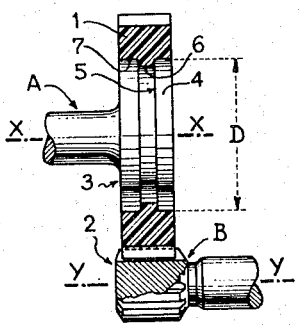
FIG. 1 is a partial sectional view of a coupling device according to the invention of the gear type.

In the embodiment shown in FIG. 1, the coupling device is adapted to couple a driving shaft A having an axis X—X to a driven shaft B having an axis Y—Y which is parallel with the axis X—X, the connection being through a train of gears comprising a gear wheel 1 and a metal gear pinion 2 which is part of the same material as the shaft B or is secured to the latter.

The gear wheel 1 is composed of plastics material which is moulded or elastically fitted onto the metal hub 3 of for example steel, which is part of the same material as the shaft A or is secured to the latter.

The hub 3 has a diameter D and its outer surface 4 has a groove 5 in which extends a rib 6 provided on the inner surface 7 of the gear wheel 1. The surfaces 4 and 7 are smooth. The metal surface 4 is a ground surface so that there is absolutely no keying between the wheel 1 and the hub 3, the torque that this hub is capable of transmitting to the wheel 1 being determined merely by the elastic radial pressure between the wheel and the hub and by the coefficient of friction of the plastics material of this wheel relative to the metal of the hub.

The plastics material employed is so chosen that its coefficient of expansion is distinctly higher than that of the metal constituting the hub 2 which is usually steel. By way of example (which is not intended to limit the scope of the invention) there may be used: a superpolyamide known under the trade name of "nylon" or a superpolyamide sold under the trademark "Rilsan"; a formalpolyvinyl resin such as those sold by the company Du Pont de Nemours (Geneva) under the trademark of "Delrin" and in particular under the trademarks of "Delrin 100" and "Delrin 500"; or the resins sold under the trademark of "Makrolon" by the Company Farbenfabriken "Bayer" A.G. (Germany) and the trade name of "Nylafil" by the Company Belgazote (Belgium).

It will be clear that the choice of the material employed is related to the conditions of use and that only knowledge of the problem to be solved and in particular of the torque to be transmitted permits this choice.

The device of the invention operates in the following manner:

At rest, the gear wheel 1 of plastics material elastically grips the hub 3 and there exists a coefficient of friction $f$ between the co-operating smooth surfaces 7 and 4. It will be recalled that this coefficient $f$ is equal to $$\frac{F}{p}$$

$F$ being equal to the frictional force during the movement and $p$ the normal pressure at the temperature of operation. Therefore when the shaft A is driven in either direction, the hub 3 transmits to the wheel 1 a torque $$F \times \frac{D}{2} = pf\frac{D}{2}$$

and this torque is transmitted by the wheel 1 and the pinion 2 to the driven shaft B.

So long as the driving torque is less than or at the most equal to, this transmittable torque, the shaft B is driven relative to the shaft A without slip, the transmission ration being that provided by the gears 1 and 2, but when the resistant torque applied to the shaft B, for example owing to a blocking of this shaft, exceeds $$pf\frac{D}{2}$$

slip occurs between the wheel 1 and the hub 3. But owing to friction this is accompanied by a generation of heat and a corresponding increase in the temperature of the wheel 1 and hub 3. Now, as the wheel 1 has a coefficient of expansion exceeding that of the hub 3 (the ratio of 1.4 to 1.7 in the case of "nylon," 2 in the case of "Rilsan," 5 to 8 in the case of "Delrin 100," 6 to 8 in the case of "Delrin 500" as opposed to 1.22 in the case of steel), the wheel 1 rotates relative to the hub 3 and the radial pressure decreases so as to even disappear after a certain lapse of time if the blocking of the shaft B continues and the shaft A continues to rotate.

Consequently the coupling device constitutes a progressive uncoupling or declutching device, the uncoupling period corresponding to a diminishing braking of the shaft A.

It will be understood that as soon as the uncoupling has been obtained heat is no longer generated and the wheel 1 becomes once more clamped round the hub 3 if the incident continues to exist. In this way there are obtained alternating periods of braking which are at first progressive and then decrease, and uncouplings. These phenomena cease as soon as the cause is removed.

It will be clear that in the embodiment shown in FIG. 1 the functions performed by the shafts A and B could be reversed, the shaft B being the driving shaft and the shaft A the driven shaft. These shafts A and B could moreover be replaced by any other means one of which is a driving means and the other a driven means.

Figure 2:
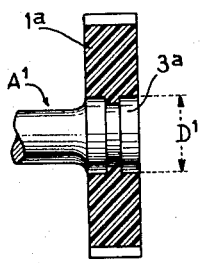
FIG. 2 is a view of a variant in the manner of connecting the driving shaft and the corresponding gear element of plastics material.

FIG. 2 shows another embodiment similar to that shown in FIG. 1 but in which the hub $3a$ of the shaft $A^1$ has a diameter $D^1$ smaller than the diameter $D$ of the hub 3 of the first embodiment. It will be understood that the torque transmitted depends on the choice of the diameter $D$, $D^1$ or other diameter.

For a given diameter, such as $D^2$ (FIGS. 3 and 4), it is furthermore possible to vary the torque transmitted by the hub $3b$ to the wheel $1b$ by varying the surface of contact $7d$ between the wheel $1b$ and the hub $3b$, by means of a number of recesses $8b$ formed in the surface $7b$, for example four recesses diametrally opposed in pairs as shown.

Figure 3:
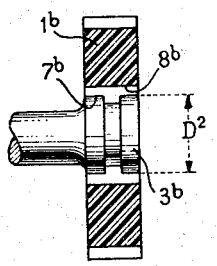
FIG. 3 is a similar sectional view.
Figure 4:
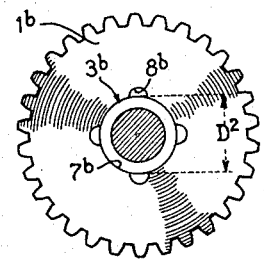
FIG. 4 is a front elevational view of the device as shown in FIG. 3.
Figure 5:
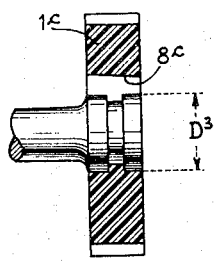
FIGS. 5 and 6 are views similar to FIGS. 3 and 4 respectively.
Figure 6:
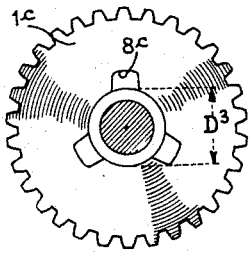

FIGS. 5 and 6 show by comparison with FIGS. 3 and 4, an embodiment in which the wheel $1c$ has only 3 recesses $8c$ which are angularly spaced 120° apart from each other but which have a greater width so that the result is substantially the same.

Figure 7:
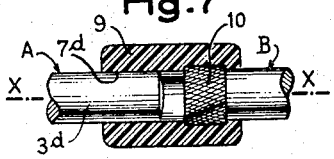
FIG. 7 is a view of a coupling according to the invention provided with a sleeve of plastics material.

FIG. 7 shows an embodiment in which the shafts A and B are coaxially disposed on the axis X—X and the connection is achieved by means of a sleeve 9 composed of any of the aforementioned plastics materials or the like.

This sleeve is rigid with one of the shafts by a rigid attachment obtained for example by knurling 10 formed on the end of the shaft B (or A) whereas the shaft A (or B) is engaged through the medium of a smooth ground portion $3d$ disposed in a smooth bore $7d$ of the sleeve 9. The effective area of contact between the surfaces $7d$ and $3d$ can be, if desired, regulated by longitudinal grooves and/or circumferential grooves formed in at least one of these two surfaces.

Figure 8:
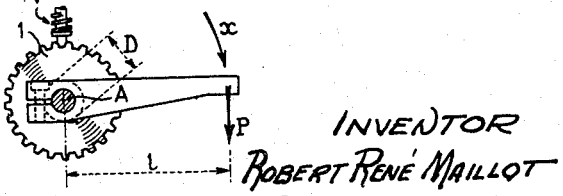
FIG. 8 is a diagrammatic view of an assembly which permits testing and adjusting the coupling devices according to the invention.

FIG. 8 shows by way of example means for testing the torque transmittable by an element, such as an element 1 of plastics material, which is mounted on the shaft A through the medium of smooth surfaces which afford a given transmission torque determined by the coefficient of friction.

Secured to the shaft A is a lever arm L having a leverage $l$ at the end of which can be secured a load P. The ratio obtained is equal to $$\frac{2l}{D}$$

Therefore an adjustable torque $Pl$ can be applied to the shaft A and the wheel 1 can be prevented from rotating by means of a locking device V. For a given interference fit between the wheel 1 and the shaft A, which gives a surface pressure $p$ and by progressively increasing the load P, it is possible to exactly determine the torque $$Pl = pf\frac{D}{2}$$

for which slip starts to occur followed by the release of the coupling, the start of the slip being revealed by the start of an oscillation of the lever L in the direction of arrow $x$.

With this arrangement it is possible to determine exactly in respect of each type of coupling to be designed, the surface of friction which is suitable for a given torque to be transmitted between the element of plastics material and its shaft.

The exact determination of this surface is obtained by varying the number and/or the dimensions of the ribs or grooves or longitudinal recesses and/or peripheral recesses formed on the shaft or in the element of plastics material.

The following table gives by way of examples in respect of the devices shown in FIGS. 1, 2, 3, 4 and 5, 6 the results obtained by means of the device shown in FIG. 8 in the case of a gear of plastics material known under the trade name of "Delrin 100" which has a width of 10 mm. and 46 teeth of module 1 and with the indicated hub diameters:

$$D = 33 \text{ mm.}$$

and $$D^1 = D^2 = D^3 = 15 \text{ mm.}$$

The weight necessary to initiate slip between the hub 3 and the gear wheel was found to be:

| Example | Diameter of hub in mm. | Weight producing the start of slip in kgs. |
|---|---|---|
| Fig. 1 | 33 | 4.200 |
| Fig. 2 | 15 | 2.800 |
| Figs. 3, 4 | 15 | 2.100 |
| Figs. 5, 6 | 15 | 1.600 |

The differences in respect of the examples shown in FIGS. 2, 3–4, and 5–6 are due to the recesses 6b and 6c.

These examples show that it is possible to regulate as a function of a normal torque the adherence of the plastics material of the gear wheel to the shaft for transmitting the necessary torque without any slip in continuous operation, but that if the driven element suddenly stopped, the shaft driven by the gear wheel is blocked and the shock produced by the inertia of the masses in movement which constitutes kinetic energy exceeds the normal torque, the gear wheel rotationally slips for a very short period and the absorption of the shock avoids breakage of a tooth of the gear wheel.

The foregoing examples were confirmed in series production in that in respect of 100 articles the results obtained were, for example in the example shown in FIGS. 5 and 6, 1.500 kg.±0.100—which confirms that for a given condition of the ground surface of the metal hub and even taking into account possible differences due to moulding in series production, the desired result is obtained and is constant with a very sufficient approximation.

The embodiments described hereinbefore show that by means of the invention it is possible to employ gear wheels composed of plastics materials with driving sleeves which resist even percussion forces.

Although specific embodiments of the invention have been described, many modifications and changes may be made therein without departing from the scope of the invention as defined in the appended claims.

Having now described my invention what I claim as new and desire to secure by Letters Patent is:

1. A coupling device for coupling a driving member to a driven member, said device comprising an element of plastics material which is connected to both of said members for the purpose of transmitting a given torque from the driving member to the driven member, the connection between the element and one of said members comprising a smooth cylindrical ground surface on said one of said members and a smooth cylindrical aperture formed in the element which is an interference fit on said ground surface of such class that slip occurs between said one of said members and the element when said given torque is exceeded, the coefficient of expansion of said plastics material being several times greater than that of the material of which said one of said members is composed, whereby when said slip occurs the heat generated by friction causes an expansion of the element which exceeds that of said one of said members and the element progressively uncouples the members as the temperature rises.

2. A coupling device for coupling a driving member to a driven member, said device comprising an element of plastics material which is connected to both of said members for the purpose of transmitting a given torque from the driving member to the driven member, the connection between the element and one of said members comprising a smooth cylindrical ground surface on said one of said members and a smooth cylindrical aperture formed in the element which is an interference fit on said ground surface of such class that slip occurs between said one of said members and the element when said given torque is exceeded, the coefficient of expansion of said plastics material being several times greater than that of the material of which said one of said members is composed, whereby when said slip occurs the heat generated by friction causes an expansion of the element which exceeds that of said one of said members and the element progressively uncouples the members as the temperature rises, said device further comprising recesses provided in one of said cylindrical surfaces for reducing the contact and consequently the friction between said surfaces.

References Cited by the Examiner

UNITED STATES PATENTS

| | | | |
|---|---|---|---|
| 2,132,765 | 10/38 | Stoekle | 64—30 X |
| 2,763,141 | 9/56 | Dodge | 64—30 |
| 2,814,188 | 11/57 | Fox | 64—30 |
| 2,904,977 | 9/59 | Caspari. | |
| 2,995,019 | 8/61 | Stamm | 64—30 |
| 3,134,246 | 5/64 | Mesh | 64—30 |

ROBERT C. RIORDON, *Primary Examiner.*

UNITED STATES PATENT OFFICE
CERTIFICATE OF CORRECTION

Patent No. 3,186,190                                June 1, 1965

Robert René Maillot

It is hereby certified that error appears in the above numbered patent requiring correction and that the said Letters Patent should read as corrected below.

Column 3, line 34, for "ration" read -- ratio --.

Signed and sealed this 30th day of November 1965.

(SEAL)
Attest:

ERNEST W. SWIDER                            EDWARD J. BRENNER
Attesting Officer                               Commissioner of Patents